United States Patent
Tobari et al.

(10) Patent No.: US 7,388,341 B2
(45) Date of Patent: Jun. 17, 2008

(54) CONTROL SYSTEM FOR PERMANENT MAGNET SYNCHRONOUS MOTOR AND MODULE

(75) Inventors: Kazuaki Tobari, Hitachiota (JP); Kiyoshi Sakamoto, Hitachi (JP); Tsunehiro Endo, Hitachiota (JP); Yoshitaka Iwaji, Hitachinaka (JP); Yukio Kawabata, Hitachinaka (JP); Shigehisa Aoyagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 11/205,907

(22) Filed: Aug. 17, 2005

(65) Prior Publication Data

US 2006/0055362 A1 Mar. 16, 2006

(30) Foreign Application Priority Data

Sep. 14, 2004 (JP) ............................. 2004-266164

(51) Int. Cl.
*H02P 6/08* (2006.01)

(52) U.S. Cl. ........................... 318/400.07; 318/400.14; 318/400.17; 318/400.32

(58) Field of Classification Search ................ 318/138, 318/254, 432, 434, 700–800, 400.01, 400.02, 318/400.07, 400.14, 400.17, 400.2, 400.32
See application file for complete search history.

(56) References Cited

U.S. PATENT DOCUMENTS

| | | | | |
|---|---|---|---|---|
| 5,608,302 | A * | 3/1997 | Umida ........................ | 318/802 |
| 6,396,229 | B1 * | 5/2002 | Sakamoto et al. ..... | 318/400.02 |
| 7,071,641 | B2 * | 7/2006 | Arai et al. ............. | 318/400.02 |
| 7,076,340 | B1 * | 7/2006 | Inazumi et al. ............. | 700/298 |
| 7,294,988 | B2 * | 11/2007 | Ajima et al. ................ | 318/712 |
| 2006/0055362 | A1 * | 3/2006 | Tobari et al. ................ | 318/716 |
| 2007/0001635 | A1 * | 1/2007 | Ho ............................. | 318/254 |

FOREIGN PATENT DOCUMENTS

JP 2003-164188 6/2003

\* cited by examiner

*Primary Examiner*—Bentsu Ro
(74) *Attorney, Agent, or Firm*—Crowell & Moring LLP

(57) ABSTRACT

A vector control system for a permanent magnet synchronous motor, using a current control equivalent output value, a frequency instruction value, a current detection value, an inference phase error value, and a motor constant, identifies a motor resistance equivalent or a resistance setting error equivalent. Next, the vector control unit, using the identified value, corrects a set value R* equivalent of a voltage instruction calculation unit and a n inference phase error calculation unit.

Thereby, a vector control system for a permanent magnet synchronous motor can realize a robust control characteristic for changing of a resistance constant of a motor in a low rotation speed area under position sensor-less control. Further, a vector control system for a permanent magnet synchronous motor can be applied in common in a system performing inexpensive current detection.

14 Claims, 11 Drawing Sheets

… (US 7,388,341 B2)

CONTROL SYSTEM FOR PERMANENT MAGNET SYNCHRONOUS MOTOR AND MODULE

CLAIM OF PRIORITY

The present application claims priority from Japanese application serial no. 2004-266164, filed on Sep. 14, 2004, the content of which is hereby incorporated by reference into this application.

FIELD OF THE INVENTION

The present invention relates to a position sensor-less vector control system of a permanent magnet synchronous motor.

BACKGROUND OF THE INVENTION

As a resistance identification art of the position sensor-less vector control system, in Japanese Patent Laid-open No. 2003-164188, before starting operation of a motor, a method for applying an inverter voltage so as to restrict the motor and identifying the resistance from the voltage and restriction current flowing and during operation, a method for installing a means for identifying the counter electromotive voltage factor of the motor, inferring the motor temperature from the value identified during operation and a preset counter electromotive voltage factor at normal temperature, and identifying the resistance using the inferred temperature are described.

SUMMARY OF THE INVENTION

When high torque is required during operation under speed control or torque control, it is necessary to supply a large current corresponding to the torque. When high torque is required for a long period of time, due to generation of heat by the motor current, the resistance R of the motor increases with time.

Further, under the position sensor-less control, for example, an error value (hereinafter referred to as a phase error value $\Delta\theta$) between "rotation phase instruction value $\theta c^*$ based on control shaft" and "rotation phase instruction value $\theta$ based on motor axis" is inferred by calculation, and a frequency instruction value $\omega_1^*$ is adjusted so as to reduce an inference phase error value $\Delta\theta c$ to zero, and $\omega_1^*$ is integrated, thus the rotation phase instruction value $\theta c^*$ is prepared.

In calculations of obtaining voltage instruction values $Vd^{}$ and $Vq^{}$ of the inverter and the inference phase error value $\Delta\theta c$ like this, it is necessary to set the resistance R of the motor.

When a setting error (R−R*) is caused between the set value R* and the resistance R of the motor, if an impact load disturbance is caused in the low-speed rotation area, the actual phase error value $\Delta\theta$ and the inference phase error value $\Delta\theta c$ are shifted from each other, thus the optimal phase cannot be controlled, and the apparatus may fall into an un-operable state.

However, in the method described in Japanese Patent Laid-open No. 2003-164188, the identification calculation of the counter electromotive voltage factor must be executed in an area of small load torque and a problem arises that the calculation accuracy is impaired in an area of high torque.

Therefore, during the high-torque operation, the inference accuracy of the motor temperature is impaired, thus it is impossible to realize "highly accurate resistance identification".

An object of the present invention is to provide a vector control of a permanent magnet synchronous motor realizing highly accurate position sensor-less vector control even in a high-torque area.

The present invention, using the current control equivalent output value, current detection value, frequency instruction value, inference phase error value, and motor constant, identifies the motor resistance equivalent or resistance setting error equivalent and using the identified value, corrects the set value R* equivalent of the voltage instruction calculation unit and phase error calculation unit.

DESCRIPTION OF THE PREFERRED EMBODIMENTS

Hereinafter, the embodiments of the present invention will be explained in detail with reference to the accompanying drawings.

First Embodiment

Figure 1:
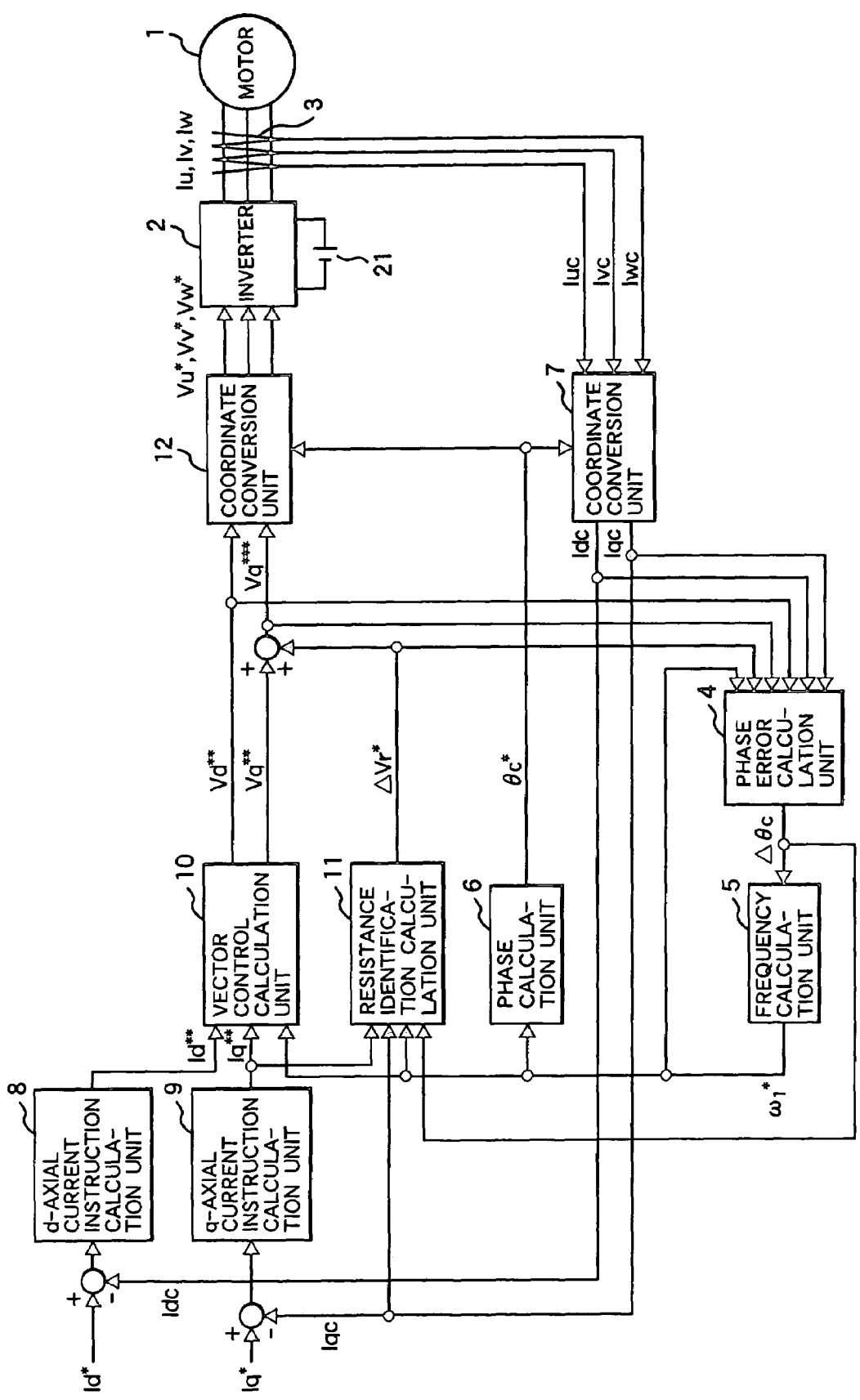
FIG. 1 is an example of the block diagram of the vector control system for the permanent magnet synchronous motor indicating an embodiment of the present invention.

FIG. 1 shows a constitution example of the vector control system for the permanent magnet synchronous motor of an embodiment of the present invention.

Numeral 1 indicates a permanent magnet synchronous motor, 2 an inverter for outputting voltages proportional to 3-phase AC voltage instruction values Vu*, Vv*, and Vw*, 21 a DC power source, 3 a current detector for detecting 3-phase AC currents Iu, Iv, and Iw, 4 a phase error calculation unit for calculating the inference value ($\Delta\theta c$) of the phase error value $\Delta\theta$ (=$\theta c^*$−$\theta$) which is a deviation between the rotation phase instruction value θc* and the rotation phase value θ of the motor 1, 5 a frequency calculation unit for calculating the frequency instruction value $\omega_1^*$ from the inference phase error value Δθc, 6 a phase calculation unit for calculating the rotation phase instruction value θc* of the motor 1 from the frequency instruction value $\omega_1^*$, 7 a coordinate conversion unit for outputting the d-axial and q-axial current detection values Idc and Iqc from the detection values Iuc, Ivc, and Iwc of the 3-phase AC currents Iu, Iv, and Iw and the rotation phase instruction value θc*, 8 a d-axial current instruction calculation unit for outputting the second d-axial current instruction value Id** according to the deviation between the first d-axial current instruction value Id* given from the host computer and the d-axial current detection value Iqc, 9 a q-axial current instruction calculation unit for outputting the second q-axial current instruction value Iq** according to the deviation between the first q-axial current instruction value Iq* given from the host computer and the q-axial current detection value Iqc, 10 a vector control calculation unit for outputting the voltage instruction values Vd and Vq using the d-axial and q-axial second current instruction values Id and Jq, the frequency instruction value $\omega_1^*$, and the electrical constant of the motor 1, 11 a resistance identification calculation unit for identifying the voltage ΔVr including the resistance setting error on the basis of the second q-axial current instruction value Iq**, the q-axial current detection value Iqc, the frequency instruction value $\omega_1^*$, the inference phase error value Δθc, and the electrical constant of the motor 1, performing proportional or integral calculations using the identified value, calculating the resistance setting error voltage ΔVr*, and outputting it to the calculation unit of the q-axial voltage instruction value Vq*** and the inference phase error value Δθc, and 12 a coordinate conversion unit for outputting the 3-phase AC voltage instruction values Vu*, Vv*, and Vw* from the voltage instruction values Vd and Vq* and the rotation phase instruction value θc*.

Firstly, the basic operations of voltage control and phase control of the position sensor-less vector control system when the resistance identification calculation unit 11 which is a characteristic of the present invention is not installed (ΔVr* is zero) will be explained.

The basic operation of voltage control, in the d-axial and q-axial current instruction calculation units 8 and 9, using the first current instruction values Id* and Iq* given from the host computer and the current detection values Idc and Iqc, calculates the intermediate current instruction values Id and Iq used for vector control calculations.

The vector control calculation unit 10, using the second current instruction values Id and Iq, the frequency instruction value $\omega_1^*$, and the set value of the motor constant, calculates the voltage instruction values Vd and Vq shown in Formula (1), and controls the voltage instruction values Vu*, Vv*, and Vw* of the inverter.

$$\begin{bmatrix} Vd^{} \\ Vq^{} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} \quad (1)$$

In this case, R indicates a resistance, Ld a d-axial inductance, Lq a q-axial inductance, Ke an induced voltage factor, and * a set value.

On the other hand, the basic operation of phase control, in the phase error calculation unit 4, using the voltage instruction values Vd and Vq, the current detection values Idc and Iqc, the frequency instruction value $\omega_1^*$, and the set value of the motor constant, infers and calculates the phase error value Δθ(=θc*−θ) which is a deviation between the rotation phase instruction value θc* and the rotation phase value θ. The calculation of the inference phase error value Δθc is performed by Formula (2).

$$\Delta\theta c = \tan^{-1}\left(\frac{Vd^{**} - R^* \cdot Idc + \omega_1^* \cdot Lq^* \cdot Iqc}{Vq^{**} - R^* \cdot Iqc - \omega_1^* \cdot Lq^* \cdot Idc}\right) \quad (2)$$

Further, the frequency calculation unit 5, so as to reduce the inference phase error value Δθc to zero, controls the frequency instruction value $\omega_1^*$ by calculation of Formula (3).

$$\omega_1^* = -\Delta\theta c \cdot \left(Kp + \frac{Ki}{s}\right) \quad (3)$$

wherein Kp indicates a proportional gain and Ki indicates an integration gain.

The phase calculation unit 6 controls the rotation phase instruction value θc* by calculation of Formula (4) using the frequency instruction value $\omega_1^*$.

$$\theta c^* = \omega_1^* \cdot \frac{1}{s} \quad (4)$$

The aforementioned is the conventional basic operations of voltage control and phase control.

Next, the operation effects when the resistance identification calculation unit 11 which is a characteristic of the present invention is used will be explained.

Figure 2:
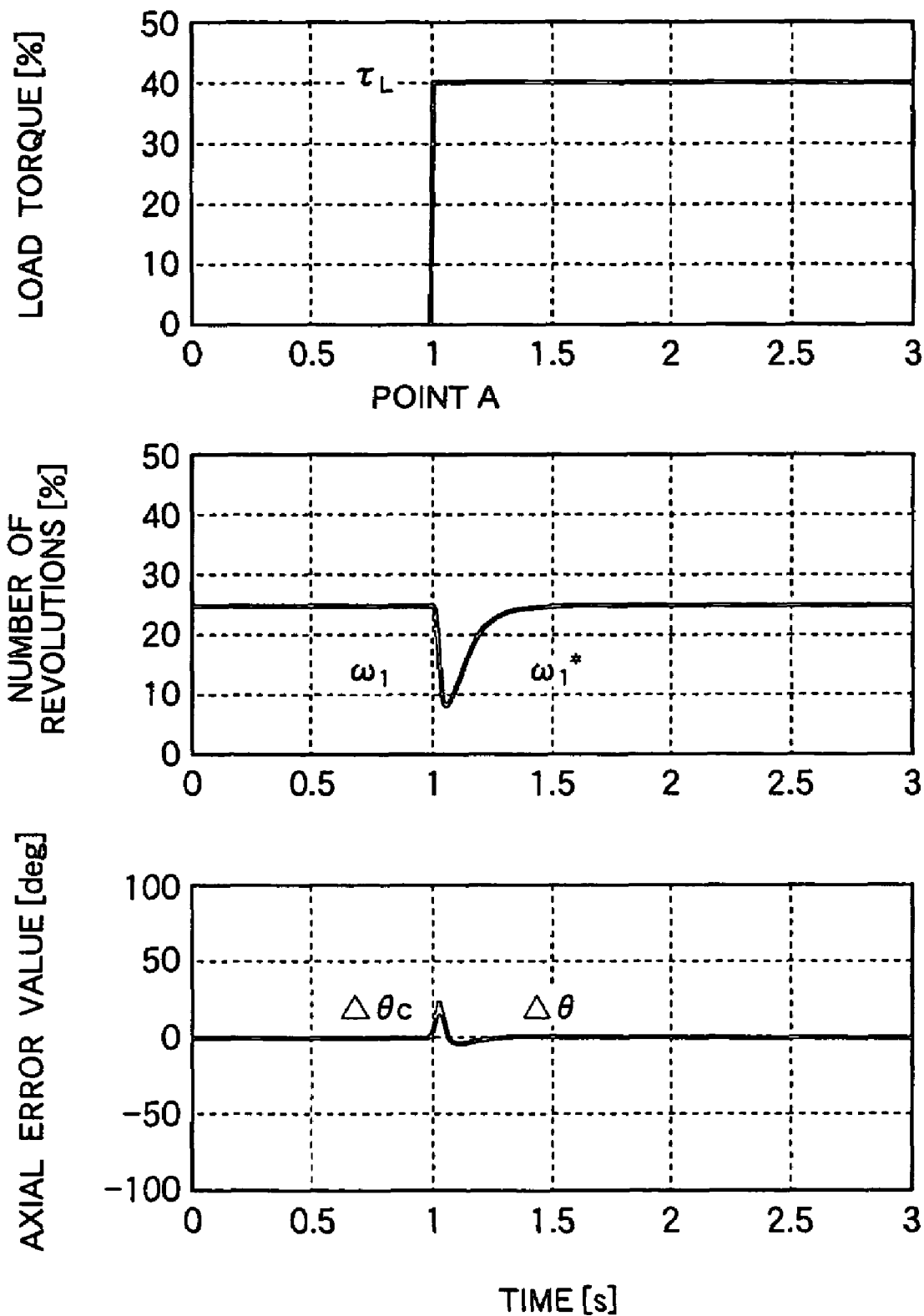
FIG. 2 is an example of the inverter load characteristic diagram (R=R*) when the resistance identification calculation unit 11 is not used.
Figure 3:
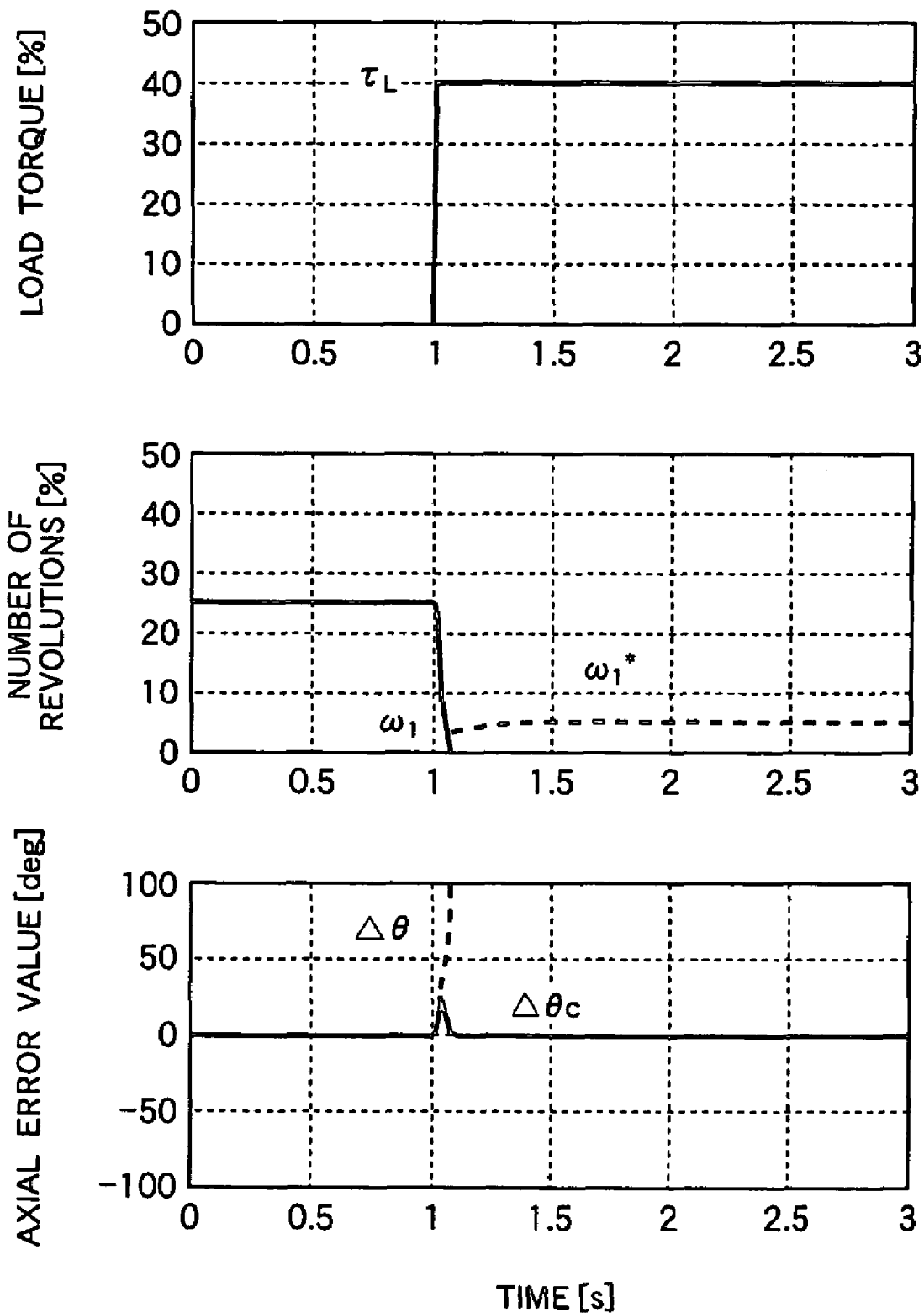
FIG. 3 is an example of the inverter load characteristic diagram (R=1.3R*) when the resistance identification calculation unit 11 is not used.

In the control system shown in FIG. 1, when the resistance setting error voltage ΔVr* is not added, the simulation characteristics when an impact load is applied are shown in FIGS. 2 and 3.

FIG. 2 shows the characteristics when the resistance R of the motor and the set value R* set in the phase difference calculation unit 4 and the vector control calculation unit 10 coincide with each other (R=R*).

In a control configuration that a speed control system is added to the host system, when the motor is during the constant operation at the 25[%] speed of the low rotation speed area of the motor, at a point of A after 1 [s], when an impact load of □L is applied, the rotation speed of the motor is suddenly reduced closely to the 10[%] speed.

At this time, the situation is found that the actual phase error value Δθ(θc*−θ) and the inference phase error value Δθc coincide with each other and the rotation frequency $\omega_1$ and the frequency instruction value $\omega_1^*$ are recovered stably.

However, when the resistance R of the motor and the set value R* do not coincide with each other in FIG. 3 (R=1.3× R*), the situation is found that when the impact load is applied, the rotation frequency $\omega_1$ is reduced to zero and the frequency instruction value $\omega_1^*$ is stably fixed to a larger value than zero (here, referred as to an unoperable state). At this time, it is found that the actual phase error value Δθ(θc*−θ) and the inference phase error value Δθc do not coincide with each other.

After all, when there is a resistance setting error (R−R*) in the low rotation speed area in the phase error calculation unit 4 and the vector control calculation unit 10, at the time of application of the impact load, the unoperable state may be caused.

Here, the resistance identification principle which is a characteristic of the present invention will be explained.

In the vector control calculation unit 10, the voltage instruction values Vd and Vq indicated in Formula (5) which is the same as Formula (1) is calculated.

$$\begin{bmatrix} Vd^{} \\ Vq^{} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} \tag{5}$$

When the phase error value Δθ which is a deviation between θc* which is a reference of the control shaft and θ which is a reference of the motor is caused, the coordinate conversion matrix from the control shaft (dc-qc) to the motor shaft (d-q) is expressed by Formula (6).

$$\begin{bmatrix} d \\ q \end{bmatrix} = \begin{bmatrix} \cos\Delta\theta & -\sin\Delta\theta \\ \sin\Delta\theta & \cos\Delta\theta \end{bmatrix} \cdot \begin{bmatrix} dc \\ qc \end{bmatrix} \tag{6}$$

When the aforementioned phase error value Δθ is caused, the application voltages Vd and Vq of the motor which are calculated by the control side are changed from Formulas (5) and (6) to Formula (7).

$$\begin{bmatrix} Vd \\ Vq \end{bmatrix} = \tag{7}$$
$$\begin{bmatrix} \cos\Delta\theta & -\sin\Delta\theta \\ \sin\Delta\theta & \cos\Delta\theta \end{bmatrix} \cdot \left[ \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} \right]$$

On the other hand, the application voltages Vd and Vq of the motor are expressed as shown below using the inference phase error value Δθc, the current detection values Idc and Iqc, and the motor constant.

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ Ke \end{bmatrix} \tag{8}$$
$$= \begin{bmatrix} R & -\omega_1 \cdot Lq \\ \omega_1 \cdot Ld & R \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} +$$
$$\begin{bmatrix} 0 \\ \omega_1 \cdot Ke \end{bmatrix}$$

Here, from the relationship of the right side of Formula (7)= the right side of Formula (8), Lq*=Lq, Ld*=Ld, and Ke*=Ke and by setting Id* to zero and Iq* to a predetermined value, when the current instruction value is calculated, the output value Iq of the q-axial current instruction calculation unit 9** can be expressed by Formula (9).

$$Iq^{**} = \frac{R^* \cdot R \cdot Iqc + Ld \cdot Lq \cdot \omega_1^2 \cdot Iqc + R^* \cdot Ke \cdot \omega_1 \cdot (\cos\Delta\theta - 1) - Ke \cdot Lq \cdot \omega_1^2 \cdot \sin\Delta\theta}{R^{*2} + Ld \cdot Lq \cdot \omega_1^2} \tag{9}$$

Further, in Formula (9), in the low rotation speed area, Formula (10) is held.

$$R^{*2} \gg Ld \cdot Lq \cdot \omega_1^2 \tag{10}$$

Then, Formula (9) can approximate to Formula (11).

$$Iq^{**} \approx \frac{R \cdot Iqc + Ke \cdot \omega_1 \cdot (\cos\Delta\theta - 1) - \frac{Ke \cdot Lq \cdot \omega_1^2 \cdot \sin\Delta\theta}{R^*}}{R^*} \tag{11}$$

Here, when both sides of Formula (11) are multiplied by the resistance set value R* and the voltage R*×Iqc is subtracted, the following formula is obtained.

$$R^* \cdot (Iq^{**} - Iqc) = \tag{12}$$
$$(R - R^*) \cdot Iqc + Ke \cdot \omega_1 \cdot (\cos\Delta\theta - 1) - \frac{Ke \cdot Lq \cdot \omega_1^2}{R^*} \cdot \sin\Delta\theta$$

When the voltage ΔVr(=(R−R*)×Iqc) including the resistance setting error is obtained from Formula (12), the following formula is obtained.

$$(R - R^*) \cdot Iqc = \tag{13}$$
$$R^* \cdot (Iq^{**} - Iqc) + Ke \cdot \omega_1 \cdot (1 - \cos\Delta\theta) + \frac{Ke \cdot Lq \cdot \omega_1^2}{R^*} \cdot \sin\Delta\theta$$

Therefore, using the second q-axial current instruction value Iq**, the current detection value Iqc, the frequency instruction value $\omega_1^*$, the inference phase error value Δθc, and the motor constant, when Formula (14) is calculated, the voltage ΔVr can be identified.

$$\Delta Vr\hat{} = \tag{14}$$
$$R^* \cdot (Iq^{**} - Iqc) + Ke^* \cdot \omega_1^* \cdot (1 - \cos\Delta\theta c) + \frac{Ke^* \cdot Lq^* \cdot \omega_1^{*2}}{R^*} \cdot \sin\Delta\theta c$$

Next, the resistance setting error correction method using the identified voltage ΔVr̂ will be explained. In the operation of voltage control, assuming a signal obtained by multiplying the voltage ΔVr̂ calculated by Formula (14) by the proportional gain Kv as ΔVr*, the following formula is obtained.

$$\Delta Vr^* = Kv \cdot \Delta Vr\hat{} \tag{15}$$

Formula (15) is added to the q-axial voltage instruction value Vq and the new voltage instruction value is defined as Vq*.

$$\begin{bmatrix} Vd^{} \\ Vq^{*} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} + \begin{bmatrix} 0 \\ \Delta Vr \end{bmatrix} \tag{16}$$

Here, if a case that the phase error value Δθ is caused when the voltage ΔVr* is added is considered, the following formula is obtained.

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \cdot \left[ \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} + \begin{bmatrix} 0 \\ \Delta Vr \end{bmatrix} \right] \quad (17)$$

When the application voltages Vd and Vq of the motor are expressed using the motor constant (Formula 8 is described again), the following formula is obtained.

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ Ke \end{bmatrix} \quad (18)$$

$$= \begin{bmatrix} R & -\omega_1 \cdot Lq \\ \omega_1 \cdot Ld & R \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} + \begin{bmatrix} 0 \\ \omega_1 \cdot Ke \end{bmatrix}$$

From the relationship of the right side of Formula (17)= the right side of Formula (18), in the low rotation speed area, the output value Iq of the q-axial current instruction calculation unit 9** can approximate to Formula (19).

$$Iq^{**} \approx \frac{\frac{R + Kv \cdot R^*}{1 + Kv} \cdot Iqc + Ke \cdot \omega_1 \cdot (\cos\Delta\theta - 1) - \frac{Ke \cdot Lq \cdot \omega_1^2}{R^*} \cdot \sin\Delta\theta}{R^*} \quad (19)$$

When the second q-axial current instruction value Iq** obtained by Formula (19) is substituted for Formulas (14) and (15), Formula (20) is obtained.

$$\Delta Vr^* = \frac{Kv}{1 + Kv} \cdot (R - R^*) \cdot Iqc \quad (20)$$

Furthermore, when the proportional gain Kv is set to a value larger than 1 in Formula (20), the following formula is obtained.

$$\Delta Vr^* \approx (R - R^*) \cdot Iqc \quad (21)$$

From Formula (21), the voltage ΔVr equivalent including the resistance setting error can be supplied from the output value ΔVr* of the resistance identification calculation unit 11.

Figure 4:
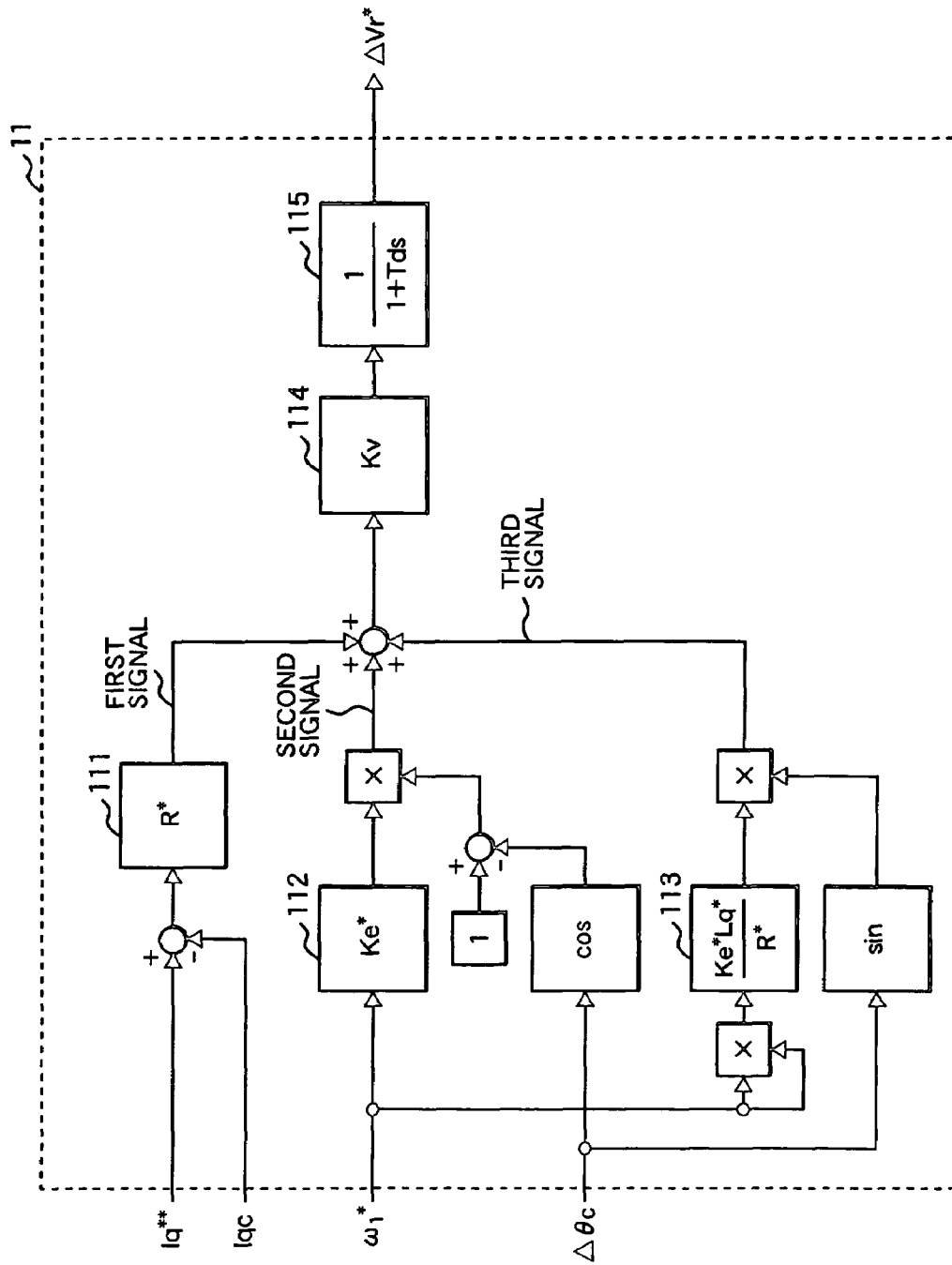
FIG. 4 is an example of the resistance identification calculation unit 11 of the control system shown in FIG. 1.

Here, by referring to FIG. 4, the resistance identification calculation unit 11 which is a characteristic of the present invention will be explained.

Basically, the resistance identification calculation unit 11 calculates Formula (14) and to the deviation between the second q-axial current instruction value Iq and the q-axial current detection value Iqc, adds a first signal obtained by multiplying a set value 111** of the motor resistance, a second signal obtained by multiplying three values including a value obtained by subtracting the cosine (cos) signal of the inference phase error value Δθc from the constant 1, the frequency instruction value $\omega_1^*$, and a set value 112 of the induced voltage factor, and a third signal obtained by multiplying three values including the sine (sin) signal of the inference phase error value, the square of the frequency instruction value, and a constant calculation value 113 of the motor.

The result obtained by multiplying the added value by a proportional gain 114 is input to a primary delay filter 115 equivalent to the current control time lag and the output value thereof is the voltage ΔVr* for correcting the resistance setting error.

Also in the operation of phase control, the resistance setting error correction is performed using the voltage ΔVr*. The phase error calculation unit 4 shown in FIG. 1, using the voltage instruction values Vd and Vq*, the current detection values Idc and Iqc, the frequency instruction value $\omega_1^*$, the set value of the motor constant, and the voltage ΔVr*, infers and calculates the phase error value Δθ.

The inference phase error value Δθc is calculated by Formula (22).

$$\Delta\theta c = \tan^{-1}\left( \frac{Vd^{**} - R^* \cdot Idc + \omega_1^* \cdot Lq^* \cdot Iqc}{Vq^{***} - R^* \cdot Iqc - \omega_1^* \cdot Lq^* \cdot Idc - \Delta Vr^*} \right) \quad (22)$$

From Formulas (21) and (22), the inference phase error value Δθc is expressed by the following formula.

$$\Delta\theta c \approx \tan^{-1}\left( \frac{Vd^{**} - R^* \cdot Idc + \omega_1^* \cdot Lq^* \cdot Iqc}{Vq^{**} - R^* \cdot Iqc - \omega_1^* \cdot Lq^* \cdot Idc - (R - R^*) \cdot Idc} \right) \quad (23)$$

$$= \tan^{-1}\left( \frac{Vd^{**} - R^* \cdot Idc + \omega_1^* \cdot Lq^* \cdot Iqc}{Vq^{**} - R \cdot Iqc - \omega_1^* \cdot Lq^* \cdot Idc} \right)$$

As a result, even if the set value R* set in the phase error calculation unit 4 and the vector control calculation unit 10 does not coincide with the resistance R of the motor, using the output value Iq of the q-axial current instruction calculation unit 9**, the resistance setting error can be corrected.

Figure 5:
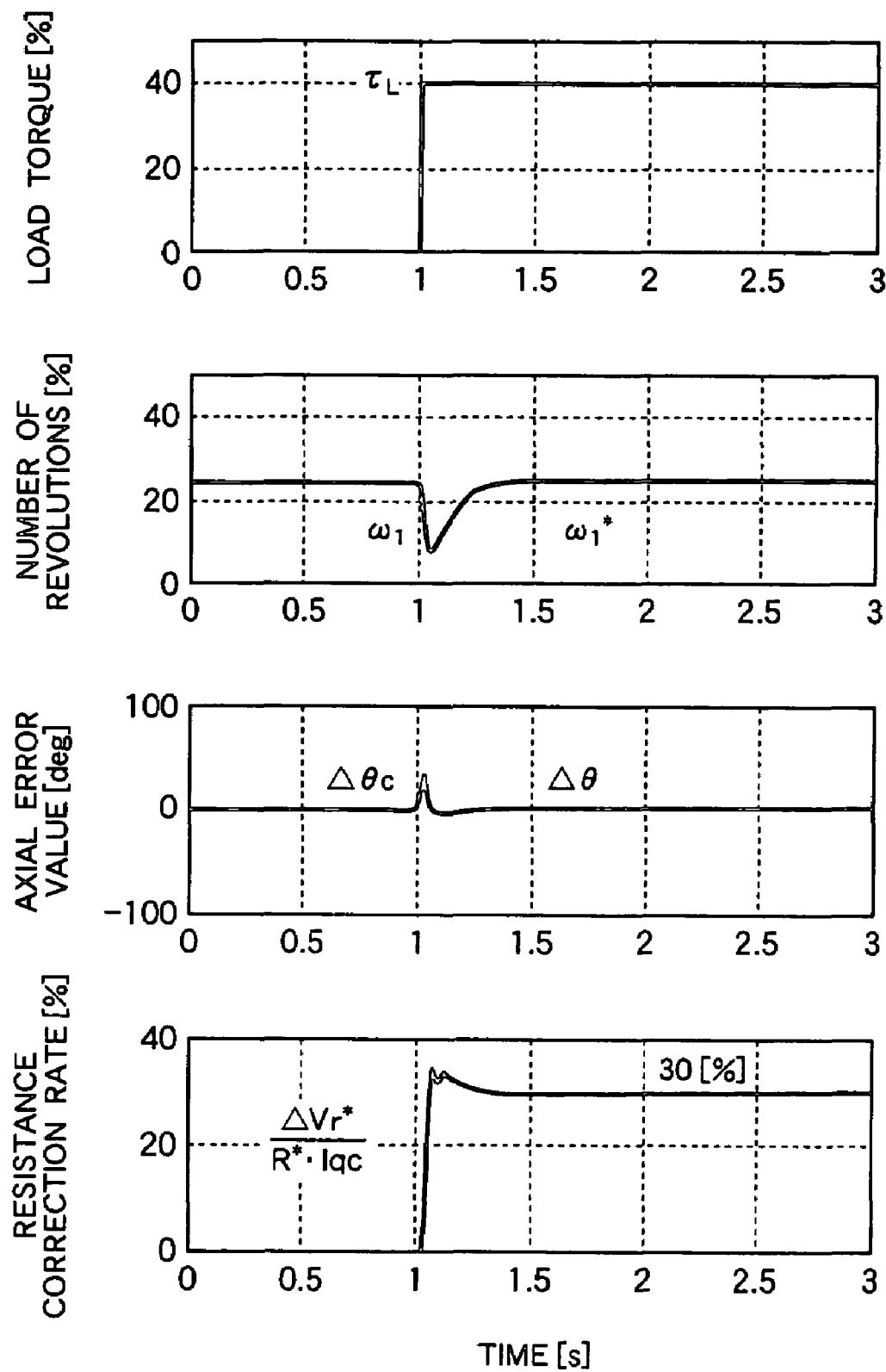
FIG. 5 is an example of the inverter load characteristic diagram (R=1.3R*) when the resistance identification calculation unit 11 is used.

FIG. 5 shows a simulation waveform to which this embodiment is applied (R=1.3×R*).

It is found that even if the resistance R and the set value R* do not coincide with each other, by correcting the voltage ΔVr*, the motor does not fall into the unoperable state and is controlled stably.

"Resistance correction rate" shown in the fourth diagram indicates a ratio of "voltage ΔVr* for correcting the resistance setting error" to "product of R* and Iqc".

It is found that the resistance setting error 30[%] equivalent is corrected faithfully.

In this embodiment, a signal obtained by multiplying the identified voltage ΔVr^ by the proportional gain Kv is defined as ΔVr*. However, even if a signal obtained by integrating the voltage ΔVr*^ is defined as ΔVr*, it is clear that the same results are obtained.

Further, in this embodiment, the voltage ΔVr* is used as a voltage for correcting the resistance setting error. However, even if ΔVr* is divided by Iqc or Iq*, thus the resistance setting error (R−R*) is obtained directly and is directly added to the set values of the phase error calculation unit 4 and the vector control calculation unit 10, it is clear that the same results are obtained.

Second Embodiment

Figure 6:
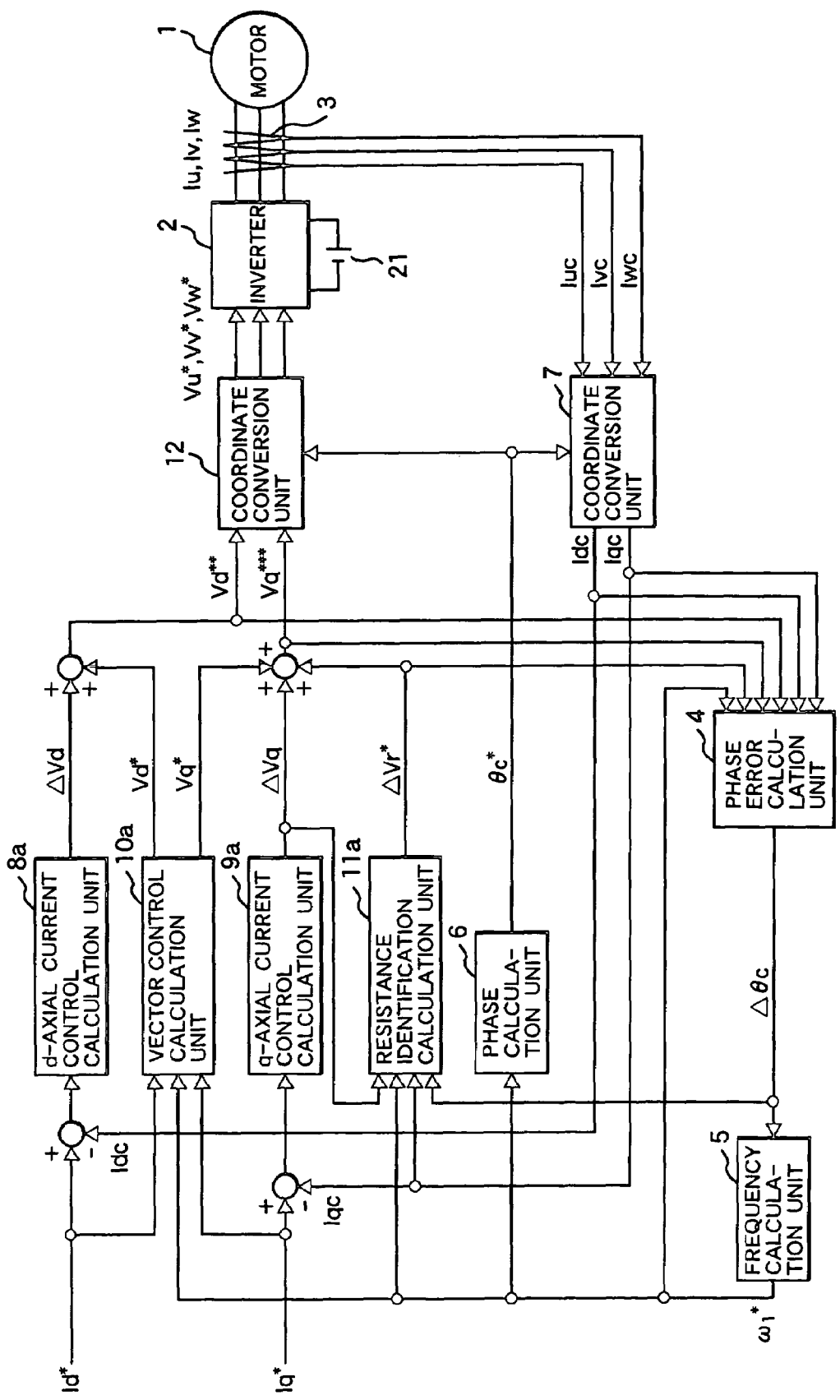
FIG. 6 is a block diagram of the vector control system for the permanent magnet synchronous motor indicating another embodiment of the present invention.

FIG. 6 shows another embodiment of the present invention.

This embodiment is the vector control system for the permanent magnet synchronous motor for correcting the output values Vd* and Vq* of the vector control calculation unit by the deviation between the current instruction value and the current detection value given from the host computer.

In FIG. 6, numerals 1 to 7, 12, and 21 indicate the same parts as those shown in FIG. 1.

Numeral 8a indicates a d-axial current control calculation unit for calculating ΔVd so as to make the d-axial current instruction value Id* and the d-axial current detection value Idc coincide with each other, 9a a q-axial current control calculation unit for calculating ΔVq so as to make the q-axial current instruction value Iq* and the q-axial current detection value Iqc coincide with each other, 10a a vector control calculation unit for outputting the reference values Vd* and Vq* of the voltage instruction using the d-axial and q-axial current instruction values Id* and Iq*, the frequency instruction value $\omega_1$*, and the set value of the motor constant, and 11a a resistance identification calculation unit for identifying the voltage ΔVr* equivalent including the resistance setting error using the q-axial current control output value ΔVq, the q-axial current detection value Iqc, the frequency instruction value $\omega_1$*, the inference phase error value Δθc, and the set value of the motor constant.

The difference from FIG. 1 indicated in the previous embodiment is that in the d-axial and q-axial current control calculation units 8a and 9a, so as to make the current detection values Idc and Iqc coincide with the current instruction values Id* and Iq* given from the host computer, the voltage correction values ΔVd and ΔVq are calculated.

Further, the difference is that in the vector control calculation unit 10a, using the current instruction values Id* and Iq*, the frequency instruction value $\omega_1$*, and the set value of the motor constant, the reference values Vd* and Vq* of the voltage instruction indicated in Formula (24) are calculated and, $$\begin{bmatrix} Vd^* \\ Vq^* \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^* \\ Iq^* \end{bmatrix} + \begin{bmatrix} 0 \\ \omega_1^* \cdot Ke^* \end{bmatrix} \quad (24)$$

As shown in Formula (25), the voltage instruction values Vd and Vq of the inverter are calculated.

$$\begin{bmatrix} Vd^{} \\ Vq^{} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^* \\ Iq^* \end{bmatrix} + \begin{bmatrix} 0 \\ \omega_1^* \cdot Ke^* \end{bmatrix} + \begin{bmatrix} \Delta Vd \\ \Delta Vq \end{bmatrix} \quad (25)$$

Next, the operation effects produced by the present invention will be explained.

Firstly, when ΔVr*=0 is held and the phase error value Δθ is caused, the voltage instruction values Vd and Vq are expressed by Formula (26).

$$\begin{bmatrix} Vd \\ Vq \end{bmatrix} = \begin{bmatrix} \cos \Delta\theta & -\sin \Delta\theta \\ \sin \Delta\theta & \cos \Delta\theta \end{bmatrix} \cdot \left[ \begin{bmatrix} R^* & -\omega_1^* \cdot Lq^* \\ \omega_1^* \cdot Ld^* & R^* \end{bmatrix} \cdot \begin{bmatrix} Id^* \\ Iq^* \end{bmatrix} + \begin{bmatrix} 0 \\ \omega_1^* \cdot Ke^* \end{bmatrix} + \begin{bmatrix} \Delta Vd \\ \Delta Vq \end{bmatrix} \right] \quad (26)$$

Further, the application voltages Vd and Vq of the motor are expressed as indicated below using the phase error value Δθ and the motor constant (the same as Formula 8).

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ Ke \end{bmatrix} \quad (27)$$

$$= \begin{bmatrix} R & -\omega_1 \cdot Lq \\ \omega_1 \cdot Ld & R \end{bmatrix} \cdot \begin{bmatrix} \cos \Delta\theta & -\sin \Delta\theta \\ \sin \Delta\theta & \cos \Delta\theta \end{bmatrix} \cdot \begin{bmatrix} Idc \\ Iqc \end{bmatrix} + \begin{bmatrix} 0 \\ \omega_1 \cdot Ke \end{bmatrix}$$

Here, from the relationship of the right side of Formula (26)= the right side of Formula (27), Lq*=Lq, Ld*=Ld, and Ke*=Ke and by setting Id* to zero and Iq* to a predetermined value, when the current is controlled, the output value ΔVq of the q-axial current control calculation unit 9a can be expressed by Formula (28).

$$\Delta Vq = (R-R^*) \cdot Iqc - \omega_1 \cdot Ke \cdot (1-\cos \Delta\theta) - \omega_1 \cdot (Ld-Lq) \cdot Iqc \cdot \sin \Delta\theta \cos \Delta\theta \quad (28)$$

Here, when the item of the voltage ΔVr(=(R−R*)×Iqc) including the resistance setting error information is arranged properly, the following formula is obtained.

$$(R-R^*) \cdot Iqc = \Delta Vq + \omega_1 \cdot Ke \cdot (1 - \cos \Delta\theta) + \omega_1 (Ld-Lq) \cdot Iqc \cdot \sin \Delta\theta \cdot \cos \Delta\theta \quad (29)$$

From Formula (29), using the output value ΔVq of the q-axial current control, the frequency instruction value $\omega_1$*, the inference phase error value Δθc, and the set value of the motor constant, when Formula (30) is calculated, the voltage ΔVr can be identified.

$$\Delta V\hat{r} = \Delta Vq + \omega_1^* \cdot Ke^* \cdot (1 - \cos \Delta\theta c) + \omega_1^* \cdot (Ld^* - Lq^*) \cdot Iqc \cdot \sin \Delta\theta c \cdot \cos \Delta\theta c \quad (30)$$

Next, the resistance setting error correction method using the voltage ΔVr̂ will be explained.

Assuming a signal obtained by multiplying the voltage ΔVr̂ calculated in Formula (30) by the proportional gain Kv as ΔVr*, the following formula is obtained.

$$\Delta Vr^* = Kv \cdot \Delta V\hat{r} \quad (31)$$

Here, Formula (31) is added to the q-axial voltage instruction value Vq** and the following formula is obtained.

$$\begin{bmatrix} Vd^{} \\ Vq^{*} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^* \\ Iq^* \end{bmatrix} + \begin{bmatrix} 0 \\ \omega_1^* \cdot Ke^* \end{bmatrix} + \begin{bmatrix} \Delta Vd \\ \Delta Vq \end{bmatrix} + \begin{bmatrix} 0 \\ \Delta Vr^* \end{bmatrix} \quad (32)$$

When Formula 32 is used for calculation of the inference phase error value Δθc, in the same way as with Embodiment 1, the voltage ΔVr equivalent including the resistance setting error can be supplied from the output value ΔVr* of the resistance identification calculation unit 11a.

This can be applied to the vector control system for the permanent magnet synchronous motor for correcting the output of the vector control calculation unit by the deviation between the current instruction value and the current detection value.

Figure 7:
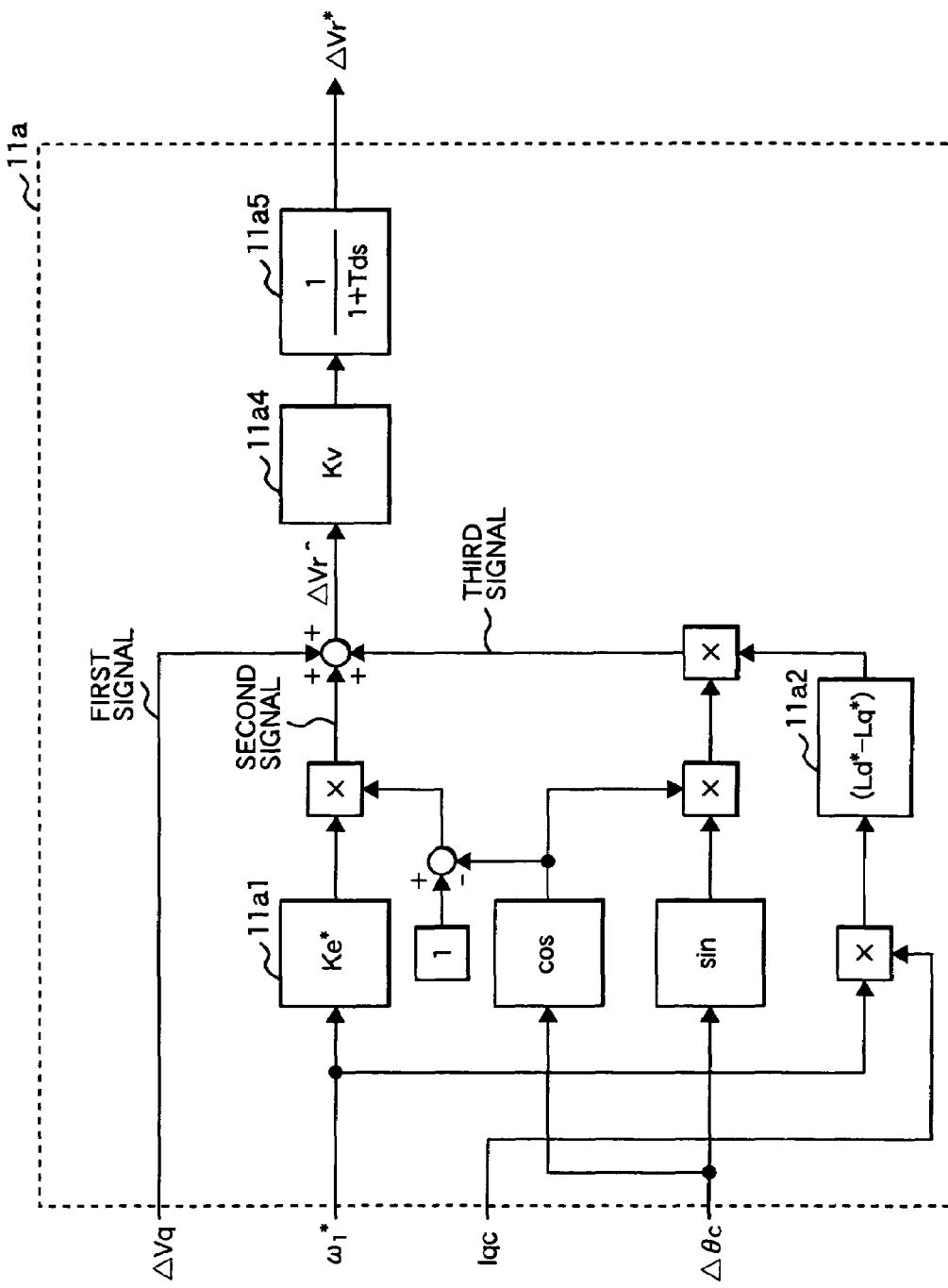
FIG. 7 is an example of the resistance identification calculation unit 11a of the control system shown in FIG. 6.

Here, by referring to FIG. 7, the resistance identification calculation unit 11a which is a characteristic of the present invention will be explained.

Basically, the resistance identification calculation unit 11a calculates Formula (30) and adds a first signal which is the output value ΔVq of q-axial current control, a second signal obtained by multiplying three values including a value obtained by subtracting the cosine (cos) signal cos Δθc of the inference phase error value Δθc from the constant 1, the frequency instruction value $\omega_1$*, and a set value 11a1 of the induced voltage factor, and a third signal obtained by multiplying five values including the sine (sin) signal sin Δθc and cosine (cos) signal cos Δθc of the inference phase error value, the frequency instruction value $\omega_1{}^*$, the q-axial current detection value Iqc, and a difference 11a2 between the d-axial inductance of the motor and the q-axial inductance.

The result obtained by multiplying the added value by a proportional gain 11a4 is input to a primary delay filter 11a5 equivalent to the current control time lag and the output value thereof is the voltage ΔVr* for correcting the resistance setting error.

In this embodiment, a signal obtained by multiplying the identified voltage ΔVr^ by the proportional gain Kv is defined as ΔVr*. However, even if a signal obtained by integrating the voltage ΔVr^ is defined as ΔVr*, it is clear that the same results are obtained.

Further, in this embodiment, the voltage ΔVr* is used as a voltage for correcting the resistance setting error. However, even if ΔVr* is divided by Iqc or Iq*, thus the resistance setting error (R−R*) is directly obtained and is directly added to the set values of the phase error calculation unit 4 and the vector control calculation unit 10a, it is clear that the same results are obtained.

Third Embodiment

Figure 8:
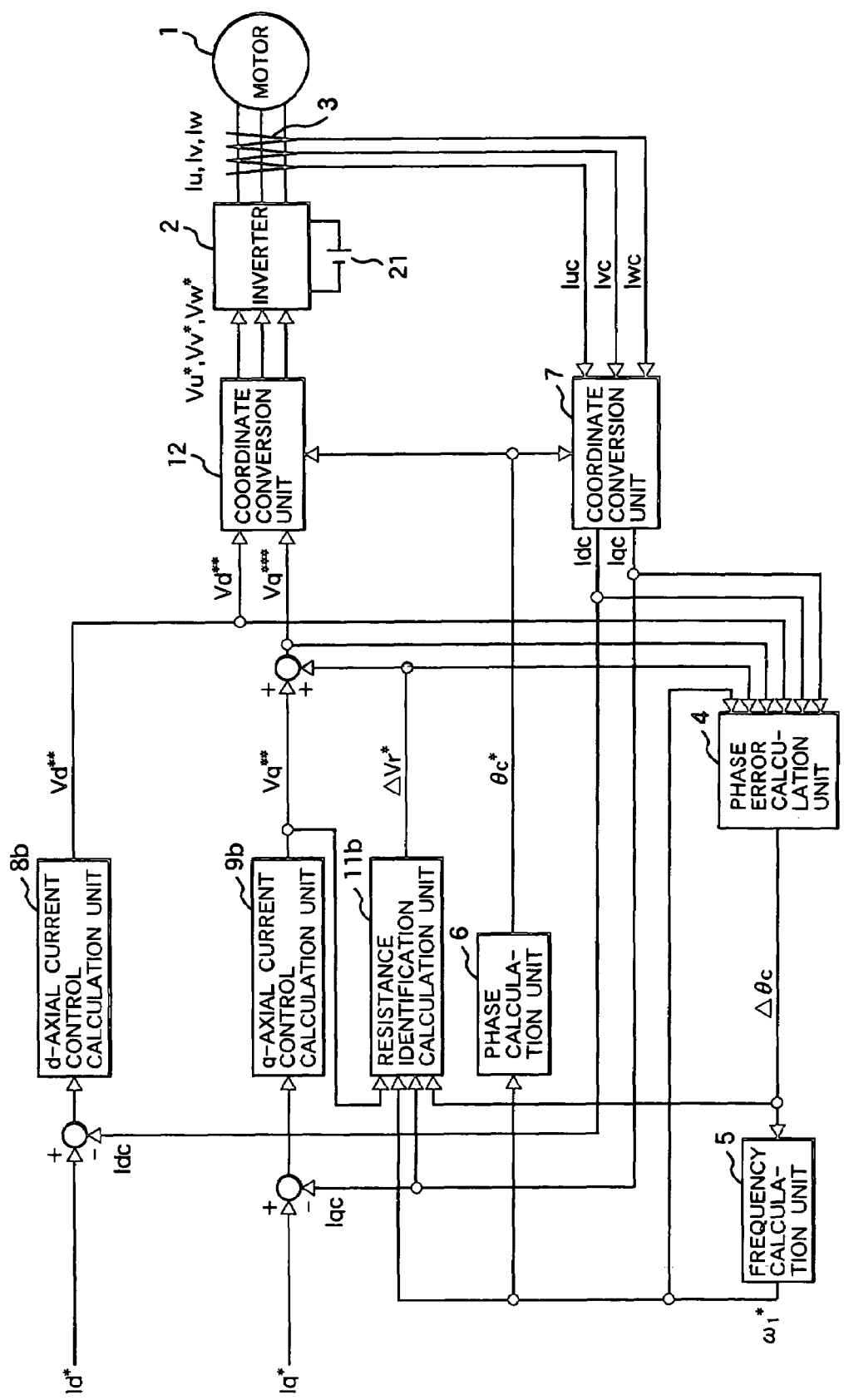
FIG. 8 is a block diagram of the vector control system for the permanent magnet synchronous motor indicating still another embodiment of the present invention.

FIG. 8 shows still another embodiment of the present invention.

This embodiment is the vector control system for the permanent magnet synchronous motor for directly controlling the d-axial and q-axial voltage instruction values Vd and Vq by the deviation between the current instruction value and the current detection value given from the host computer.

In FIG. 8, numerals 1 to 7, 12, and 21 indicate the same parts as those shown in FIG. 1. Numeral 8b indicates a d-axial current control calculation unit for controlling the d-axial voltage instruction value Vd** so as to make the d-axial current instruction value Id* and the d-axial current detection value Idc coincide with each other, 9b a q-axial current control calculation unit for controlling the q-axial voltage instruction value Vq** so as to make the q-axial current instruction value Iq* and the q-axial current detection value Iqc coincide with each other, and 11b a resistance identification calculation unit for outputting ΔVr* equivalent to the voltage ΔVr including the resistance setting error using the q-axial voltage control output value Vq**, the q-axial current detection value Iqc, the frequency instruction value $\omega_1{}^*$, the inference phase error value Δθc, and the set value of the motor constant.

The difference from FIG. 1 indicated in the previous embodiment is that in the d-axial and q-axial current control calculation units 8b and 9b, so as to make the current detection values Idc and Iqc coincide with the first current instruction values Id* and Iq* given from the host computer, the voltage instruction values Vd and Vq are calculated.

Next, the operation effects produced by the present invention will be explained.

Firstly, the application voltages Vd and Vq of the motor are expressed as indicated below using the phase error value Δθ and the motor constant (the same as Formula 8).

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ Ke \end{bmatrix} \quad (33)$$

$$= \begin{bmatrix} R & -\omega_1 \cdot Lq \\ \omega_1 \cdot Ld & R \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} + \begin{bmatrix} 0 \\ \omega_1 \cdot Ke \end{bmatrix}$$

Here, from the relationship that the voltage instruction values Vd and Vq coincide with the right side of Formula (33), Lq*=Lq, Ld*=Ld, and Ke*=Ke and by setting Id* to zero and Iq* to a predetermined value, when the current is controlled, the output value Vq of the q-axial current control calculation unit 9**b can be expressed by Formula (34).

$$Vq^{**}=R\cdot Iqc+\omega_1\cdot Ke\cdot\cos\Delta\theta-\omega_1\cdot(Ld-Lq)\cdot Iqc\cdot\sin\Delta\theta\cdot\cos\Delta\theta \quad (34)$$

Here, when the item of the voltage ΔVr(=R×Iqc) including the information of the motor resistance is arranged properly, the following formula is obtained.

$$R\cdot Iqc=Vq^{**}-\omega_1\cdot Ke\cdot\cos\Delta\theta+\omega_1\cdot(Ld-Lq)\cdot Iqc\cdot\sin\Delta\theta\cdot\cos\Delta\theta \quad (35)$$

From Formula (35), using the output value Vq** of q-axial current control, the frequency instruction value $\omega_1{}^*$, the inference phase error value Δθc, and the set value of the motor constant, when Formula (36) is calculated, the voltage ΔVr can be identified.

$$\Delta Vr\hat{}=Vq^{**}-\omega_1{}^*\cdot Ke^*\cdot\cos\Delta\theta c+\omega_1{}^*\cdot(Ld^*-Lq^*)\cdot Iqc\cdot\sin\Delta\theta c\cdot\cos\Delta\theta c \quad (36)$$

Next, the resistance correction method using the voltage ΔVr^ will be explained.

Assuming a signal obtained by adding the signal obtained by multiplying the voltage ΔVr^ calculated by Formula (36) by the proportional gain Kv to the voltage which is the product of the resistance set value R* set in the phase error calculation unit 4 and the q-axial current detection value Iqc as ΔVr*, the following formula is obtained.

$$\Delta Vr^*=Kv\cdot\Delta Vr\hat{}+R^*Iqc \quad (37)$$

A new q-axial voltage instruction value Vq*** is as indicated below.

$$Vq^{*}=Vq^{}+\Delta Vr^* \quad (38)$$

Further, when Vq*** is used for calculation of the inference phase error value Δθc, the voltage ΔVr including the resistance can be supplied from the output value ΔVr* of the resistance identification calculation unit 11b.

This can be applied to the vector control system for the permanent magnet synchronous motor for outputting the vector control calculation by the deviation between the current instruction value and the current detection value.

Figure 9:
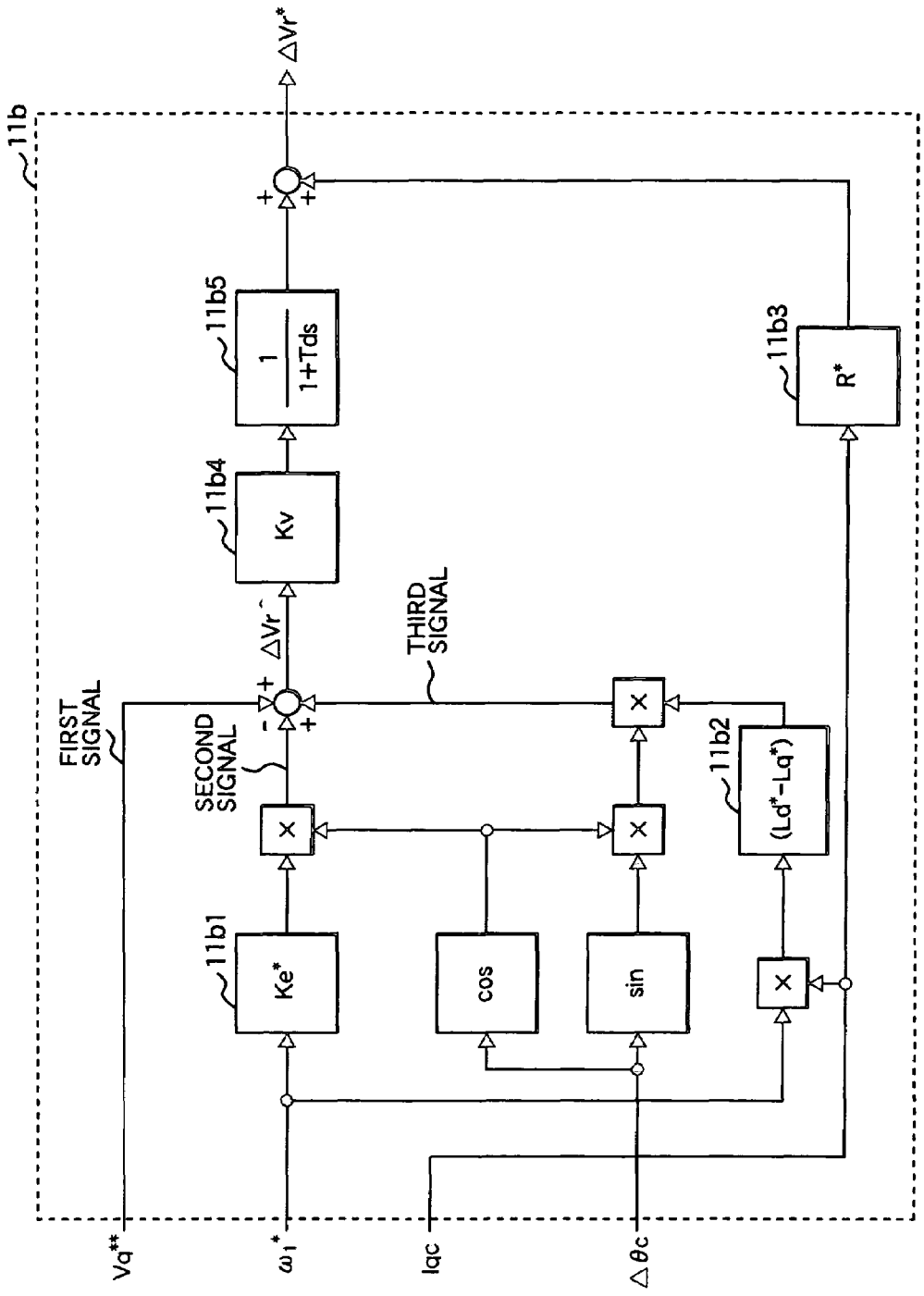
FIG. 9 is an example of the resistance identification calculation unit 11b of the control system shown in FIG. 8.

Here, by referring to FIG. 9, the resistance identification calculation unit 1b which is a characteristic of the present invention will be explained. The resistance identification calculation unit 11b adds a first signal which is the output value Vq** of q-axial current control, a second signal obtained by multiplying three values including the cosine (cos) signal of the inference phase error value Δθc, the frequency instruction value $\omega_1{}^*$, and a set value 11b1 of the induced voltage factor, and a third signal obtained by multiplying five values including the sine (sin) signal sin Δθc and cosine (cos) signal cos Δθc of the inference phase error value Δθc, the frequency instruction value $\omega_1{}^*$, the q-axial current detection value Iqc, and a difference 11b2 between the d-axial inductance of the motor and the q-axial inductance. The result obtained by multiplying the added value by a proportional gain 11b4 is input to a primary delay filter 11b5 equivalent to the current control time lag, and moreover from the output value, the product of the q-axial current detection value Iqc and a resistance set value 11b3 is subtracted, and the voltage ΔVr* for correcting the resistance setting error is obtained.

In this embodiment, a signal obtained by multiplying the identified voltage ΔVr^ by the proportional gain Kv is defined as ΔVr*. However, even if a signal obtained by integrating the voltage ΔVr^ is defined as ΔVr*, it is clear that the same results are obtained.

Further, in this embodiment, the voltage ΔVr* is used as a voltage including the resistance setting error (R−R*). However, even if the voltage ΔVr* is divided by Iqc or Iq*, thus the resistance setting error (R−R*) is directly obtained and is directly added to the set value R* of the phase error calculation unit 4, the same results are obtained.

Fourth Embodiment

In the first to third embodiments aforementioned, the method for detecting the 3-phase AC currents Iu to Iw detected by the expensive current detector 3 is used. However, the present invention can be applied to a control unit for performing inexpensive current detection.

Figure 10:
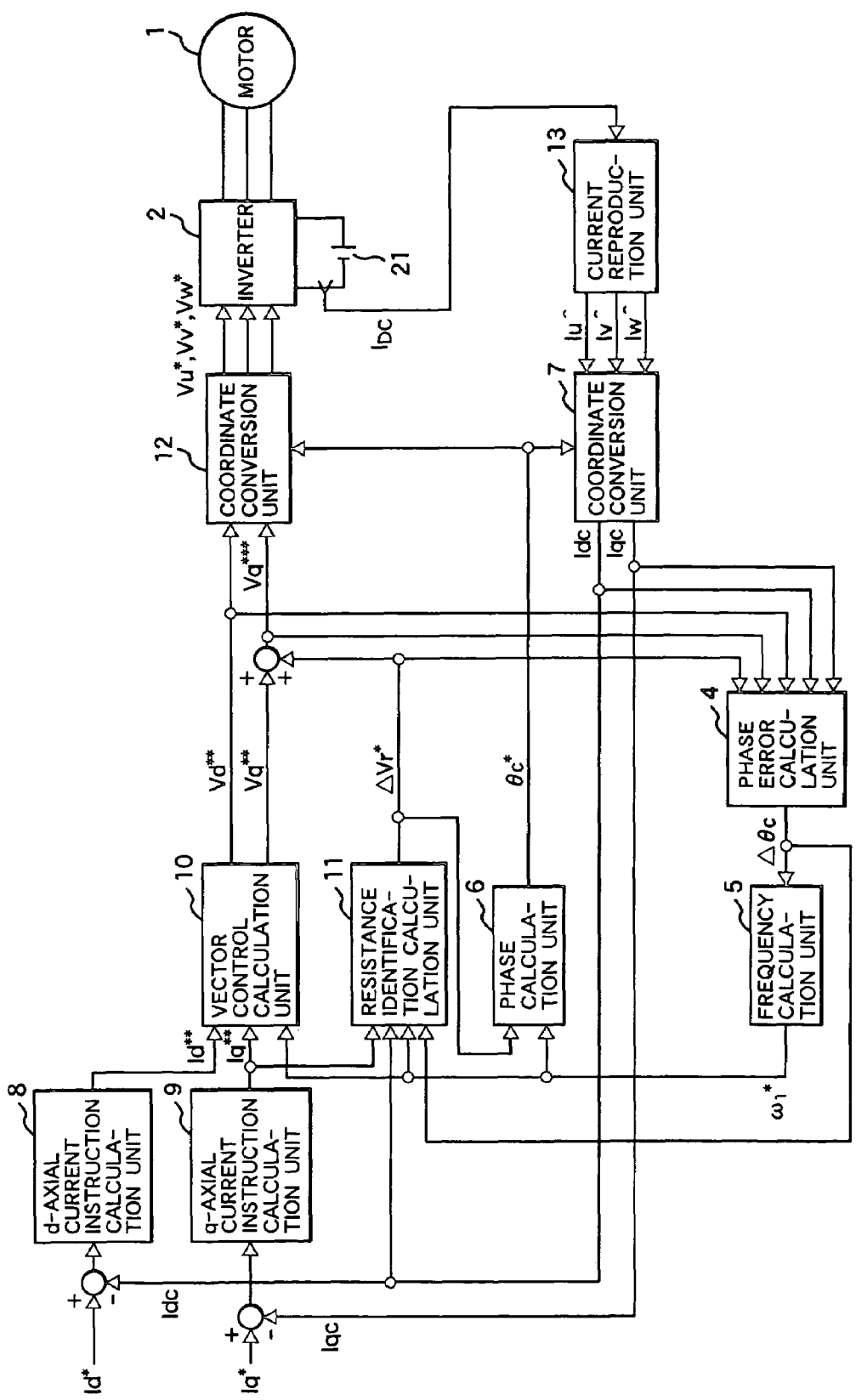
FIG. 10 is an example of the vector control system for the permanent magnet synchronous motor indicating a further embodiment of the present invention.

This embodiment is shown in FIG. 10.

In FIG. 10, the components 1, 2, 4 to 12, and 21 are the same as those shown in FIG. 1.

Numeral 13 indicates a current reproduction unit for reproducing the 3-phase AC currents Iu, Iv, and Iw flowing through the motor 1 from a DC current IDC flowing through the input bus of the inverter 2.

Using the inference currents Iu^, Iv^, and Iw^, the coordinate conversion unit 7 calculates the d-axial and q-axial current detection values Idc and Iqc.

Even such a current sensor-less control system, since Id* and Idc, and Iq* and Iqc respectively coincide with each other, operates in the same way as with the embodiment shown in FIG. 1 and it is clear that the same results are obtained.

Further, in this embodiment, the embodiment shown in FIG. 1 is used. However, even if the embodiments shown in FIGS. 6 and 8 are used, the same results are obtained.

Fifth Embodiment

Figure 11:
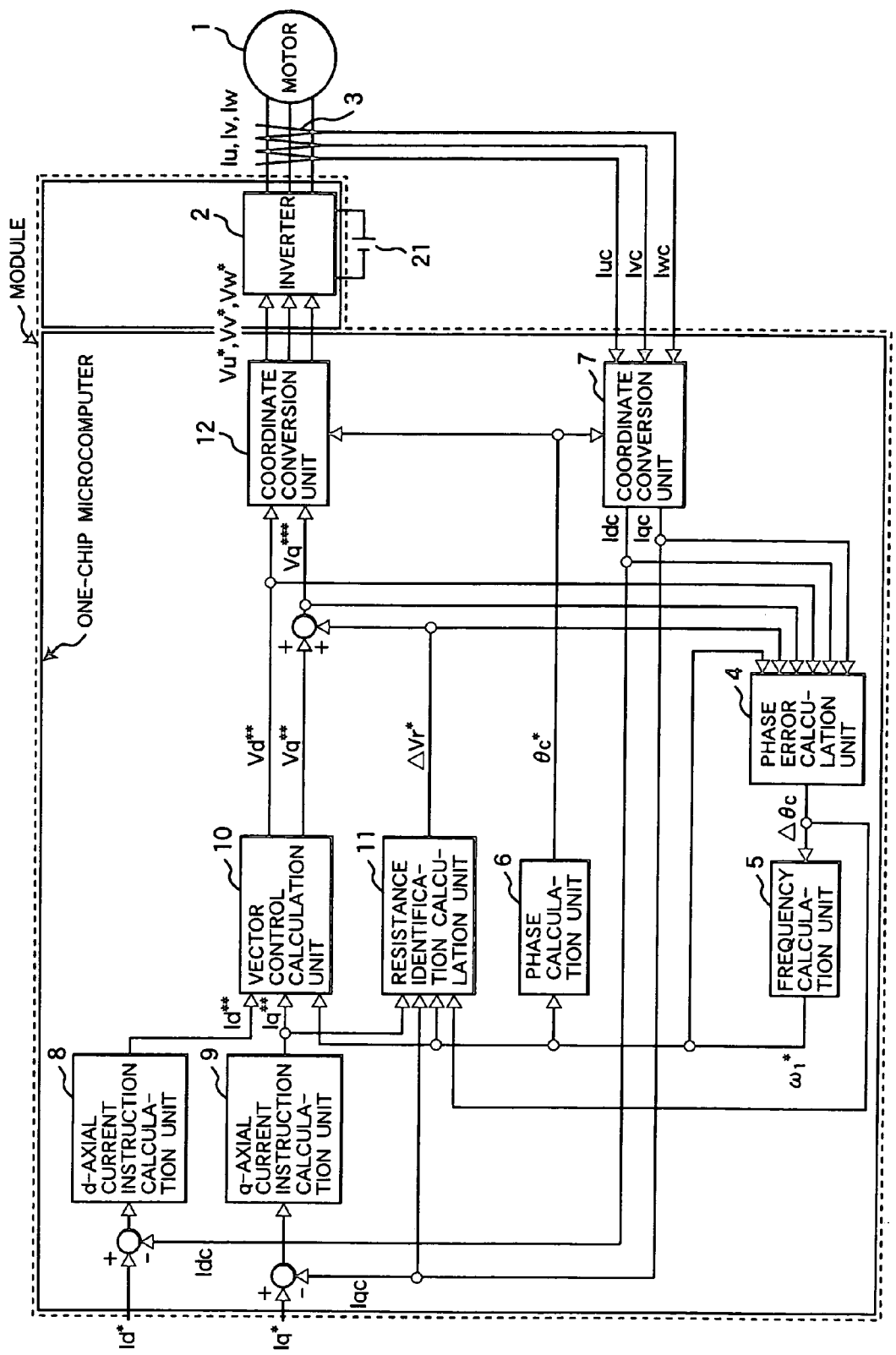
FIG. 11 is a diagram of an embodiment that the present invention is applied to a module.

An example that the present invention is applied to a module will be explained by referring to FIG. 11. This embodiment indicates the configuration of the first embodiment. Here, the phase error calculation unit 4, the frequency calculation unit 5, the phase calculation unit 6, the coordinate conversion unit 7, the d-axial current instruction calculation unit 8, the q-axial current instruction calculation unit 9, the vector control calculation unit 10, the resistance identification calculation unit 11, and the coordinated conversion unit 12 constitute a one-chip microcomputer. Further, the one-chip microcomputer and power converter (the inverter 2) are stored in one module formed on the same substrate. The module mentioned above means "standardized constituent unit" and it is composed of separable hardware and software parts. Further, from a viewpoint of manufacture, the parts are preferably formed on the same substrate, though they are not limited to the same substrate. Therefore, the parts may be formed on a plurality of circuit substrates built in the same frame. In other embodiments, the same configuration may be used.

As mentioned above, according to the present invention, in the low rotation speed area under position sensor-less control, the low burst control characteristic can be realized for changing of the resistance constant of the motor. Further, in a system performing inexpensive current detection, a vector control system for a permanent magnet synchronous motor which can be applied in common can be provided.

Further, during actual operation, the resistance equivalent of the motor is identified, and the resistance constant set in the control system is corrected automatically, thus highly precise vector control can be realized.

A vector control system for a permanent magnet synchronous motor realizing highly precise position sensor-less vector control in a high-torque area can be provided.

What is claimed is:

1. A vector control system for a permanent magnet synchronous motor for calculating a voltage instruction value of an inverter which controls the permanent magnet synchronous motor using labeled motor constants of the motor containing the resistance, obtaining an inference phase error value which is a deviation between a rotation phase instruction value obtained by integrating a frequency instruction value of the inverter for controlling said permanent magnet synchronous motor and a rotation phase value of said permanent magnet motor, and calculating said frequency instruction value so as to reduce said inference phase error value to zero, wherein:
the resistance of the motor is identified by using an output value of current control so calculated as to follow d-axial and q-axial current instruction values given from a host computer, said frequency instruction value, said inference phase error value, current detection values of a d axis and a q axis of a rotation coordinate system, and said labeled motor constants.

2. A vector control system for a permanent magnet synchronous motor according to claim 1, wherein:
said identification calculation of said resistance of said motor is executed by adding:
a first signal which is an output value under q-axial current control,
a second signal obtained by multiplying a cosine (cos) signal of said inference phase error value, said frequency instruction value, and an induced voltage factor of said motor, and
a third signal obtained by multiplying a sine (sin) signal of said inference phase error value, a cosine (cos) signal of said inference phase error value, said frequency instruction value, said q-axial current detection value, and a difference between a d-axial inductance and a q-axial inductance of said motor.

3. A vector control system for a permanent magnet synchronous motor according to claim 2, wherein:
said resistance of said motor obtained by said identification calculation, using an output value obtained by performing proportional or integral calculations and performing a primary delay process, is divided by said q-axial current instruction value or said q-axial current detection value, thus said resistance of said motor or a resistance setting error value is obtained by calculation, and said resistance set value in at least one calculation of a q-axial voltage instruction value and said phase error value is corrected.

4. A vector control system for a permanent magnet synchronous motor according to claim 1, wherein:
said identification calculation of said resistance of said motor is executed by adding:
a first signal which is an output value under q-axial current control,
a second signal obtained by multiplying three values including a value obtained by subtracting a cosine (cos) signal of said inference phase error value from a constant of 1, said frequency instruction value, and an induced voltage factor of said motor, and a third signal obtained by multiplying five values including a sine (sin) signal of said inference phase error value, said cosine (cos) signal of said inference phase error value, said frequency instruction value, said q-axial current detection value, and a difference between a d-axial inductance and a q-axial inductance of said motor.

5. A vector control system for a permanent magnet synchronous motor according to claim 4, wherein:

said resistance of said motor obtained by said identification calculation, using an output value obtained by performing proportional or integral calculations and performing a primary delay process, is divided by said q-axial current instruction value or said q-axial current detection value, thus said resistance of said motor or a resistance setting error value is obtained by calculation, and said resistance set value in at least one calculation of a q-axial voltage instruction value and said phase error value is corrected.

6. A vector control system for a permanent magnet synchronous motor according to claim 1, wherein:

said resistance of said motor is a voltage including said resistance of said motor or a voltage including error information between a set resistance and said resistance of said motor.

7. A vector control system for a permanent magnet synchronous motor according to claim 1, wherein:

said current detection value is a current obtained by reproducing said motor current from an input DC bus current detection value of said inverter.

8. A vector control system for a permanent magnet synchronous motor for calculating a voltage instruction value of an inverter which controls the permanent magnet synchronous motor using labeled motor constants of the motor containing the resistance, obtaining an inference phase error value which is a deviation between a rotation phase instruction value obtained by integrating a frequency instruction value of the inverter for controlling said permanent magnet synchronous motor and a rotation phase value of said permanent magnet motor, and calculating said frequency instruction value so as to reduce said inference phase error value to zero, wherein:

the resistance of the motor is identified by using second current instruction value so controlled as to follow first d-axial and q-axial current instruction values given from a host computer, said frequency instruction value, said inference phase error value, current detection values of a d axis and a q axis of a rotation coordinate system, and said labeled motor constants.

9. A vector control system for a permanent magnet synchronous motor according to claim 8, wherein:

said identification calculation of said resistance of said motor is executed by adding:

a first signal obtained by preparing a sine (sin) signal and a cosine (cos) signal using said inference phase error value and multiplying a resistance set in a deviation between said second q-axial current instruction value which is output of said q-axial current instruction calculation and said current detection value, a second signal obtained by multiplying a value obtained by subtracting said cosine (cos) signal of said inference phase error value from a constant of 1, said frequency instruction value, and an induced voltage factor of said motor, and a third signal obtained by multiplying said sine (sin) signal of said inference phase error value, a square of said frequency instruction value, and a constant calculation value of said motor.

10. A vector control system for a permanent magnet synchronous motor according to claim 9, wherein:

said identification calculation of said resistance of said motor is executed by dividing a product of an induced voltage factor of said motor and a q-axial inductance by a set resistance.

11. A vector control system for a permanent magnet synchronous motor according to claim 9, wherein:

said resistance of said motor obtained by said identification calculation, using an output value obtained by performing proportional or integral calculations and performing a primary delay process, is divided by said q-axial current instruction value or said q-axial current detection value, thus said resistance of said motor or a resistance setting error value is obtained by calculation, and said resistance set value in at least one calculation of a q-axial voltage instruction value and said phase error value is corrected.

12. A vector control system for a permanent magnet synchronous motor according to claim 8, wherein:

said resistance of said motor is a voltage including said resistance of said motor or a voltage including error information between a set resistance and said resistance of said motor.

13. A vector control system for a permanent magnet synchronous motor according to claim 8, wherein:

said current detection value is a current obtained by reproducing said motor current from an input DC bus current detection value of said inverter.

14. A module comprising a control unit and an inverter for calculating a voltage instruction value of the inverter which controls a permanent magnet synchronous motor using labeled motor constants of the motor containing the resistance, obtaining an inference phase error value which is a deviation between a rotation phase instruction value obtained by integrating a frequency instruction value of the inverter for controlling said permanent magnet synchronous motor and a rotation phase value of said permanent magnet motor, and calculating said frequency instruction value so as to reduce said inference phase error value to zero, wherein:

the resistance of the motor is identified by using second current instruction value so controlled as to follow first d-axial and q-axial current instruction values given from a host computer, said frequency instruction value, said inference phase error value, current detection values of a d axis and a q axis of a rotation coordinate system, and said labeled motor constants.

* * * * *